United States Patent
Zhang et al.

(10) Patent No.: US 10,620,085 B2
(45) Date of Patent: Apr. 14, 2020

(54) BRIDGE INSPECTION AND EVALUATION METHOD BASED ON IMPACT VIBRATION

(71) Applicant: SOUTHEAST UNIVERSITY, Nanjing (CN)

(72) Inventors: Jian Zhang, Nanjing (CN); Qi Xia, Nanjing (CN); Bo Zhang, Nanjing (CN); Shuanglin Guo, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 310 days.

(21) Appl. No.: 15/570,339

(22) PCT Filed: Aug. 26, 2016

(86) PCT No.: PCT/CN2016/096862
§ 371 (c)(1),
(2) Date: Oct. 29, 2017

(87) PCT Pub. No.: WO2018/000561
PCT Pub. Date: Jan. 4, 2018

(65) Prior Publication Data
US 2018/0224352 A1 Aug. 9, 2018

(30) Foreign Application Priority Data
Jun. 30, 2016 (CN) .......................... 2016 1 0510192

(51) Int. Cl.
*G01M 7/08* (2006.01)
*G01M 5/00* (2006.01)
(Continued)

(52) U.S. Cl.
CPC ............... *G01M 7/08* (2013.01); *G01H 1/00* (2013.01); *G01H 1/14* (2013.01); *G01M 5/0008* (2013.01); *G01M 5/0066* (2013.01)

(58) Field of Classification Search
None
See application file for complete search history.

(56) References Cited

U.S. PATENT DOCUMENTS

2010/0242609 A1   9/2010   Lee et al.

FOREIGN PATENT DOCUMENTS

| CN | 1804563 A | 7/2006 |
|----|-----------|--------|
| CN | 102353509 A | 2/2012 |

(Continued)

OTHER PUBLICATIONS

Law et al., "Dynamic Assessment of Bridge Load-Carrying Capacities. I" Journal of Structural Engineering, vol. 121, No. 3, 1995 (Year: 1995).*

(Continued)

*Primary Examiner* — John C Kuan
(74) *Attorney, Agent, or Firm* — Bayramoglu Law Offices LLC (57) ABSTRACT

The present invention discloses a bridge inspection and evaluation method based on impact vibration. The method includes backward analysis of the bridge based on impact on blocks without reference points and forward analysis of the bridge based on progressive impact loading, where the backward analysis of the bridge based on impact on blocks without reference points is used to rapidly inspect the medium and small bridges from the road network to find the ones with serious shortage of bearing capacity, and the forward analysis of the bridge based on progressive impact loading is used to evaluate the actual bearing capacity of the bridges, which may have good safety condition in the backward analysis. The present invention realizes low-cost and highly efficient inspection and evaluation of the medium and small bridges in the road network.

5 Claims, 7 Drawing Sheets

(51) Int. Cl.
    *G01H 1/14*    (2006.01)
    *G01H 1/00*    (2006.01)

(56)    References Cited

FOREIGN PATENT DOCUMENTS

| | | |
|---|---|---|
| CN | 103411743 A | 11/2013 |
| CN | 102353509 B | 12/2013 |
| CN | 104406757 A | 3/2015 |
| CN | 104713740 A | 6/2015 |

OTHER PUBLICATIONS

Lee et al., "Evaluation of Bridge Load Carrying Capacity Based on Dynamic Displacement Measurement Using Real-time Image Processing Techniques" Steel Structures 6 (2006) 377-385 (Year: 2006).*
Rahmatalla et al., "Finite element modal analysis and vibration-waveforms in health inspection of old bridges" Finite Elements in Analysis and Design 78 (2014) 40-46 (Year: 2014).*
Salawu et al., "Bridge Assessment Using Forced-Vibration Testing" Journal of Structural Engineering, vol. 121, No. 2, 1995 (Year: 1995).*
Wipf et al., "Development of Bridge Load Testing Process for Load Evaluation" Iowa DOT Project TR-445, CTRE Project 00-65, Final Report, Apr. 2003 (Year: 2003).*
Machine translation for CN 102353509 A (printed Oct. 25, 2019) (Year: 2019).*

\* cited by examiner

Number of combinations of modal shape direction coefficient

BRIDGE INSPECTION AND EVALUATION METHOD BASED ON IMPACT VIBRATION

CROSS REFERENCE TO RELATED APPLICATIONS

This application is the national phase entry of International Application No. PCT/CN2016/096862, filed on Aug. 26, 2016, which is based upon and claims priority to Chinese Patent Application No. 201610510192.X, filed on Jun. 30, 2016, the entire contents of which are incorporated herein by reference.

BACKGROUND OF THE INVENTION

Technical Field

The present invention relates to the field of bridge inspection and evaluation, and more particularly to the bridge inspection and evaluation method based on impact vibration.

Background

In the past hundred years, many countries have made tremendous achievements in the field of bridge construction. However, bridge damages or even collapse accidents have occurred frequently all over the world. These accidents cause great loss to people's life and property, and cause extremely severe social impact. Therefore, it becomes particularly important to inspect and evaluate bridges in time. Currently, problems in two aspects mainly exist in the inspection and evaluation of in-service bridges.

In one aspect, bridges in the road network are mostly medium and small bridges. Due to restrictions of conditions such as funds and regions, it is very difficult to inspect and evaluate these bridges in time by using conventional methods. As a result, many bridges are not thoroughly detected or even not detected, causing great safety risk. In an inspection and evaluation method based on impact vibration on the overall structure of the bridge, acceleration responses at all measurement points on the entire deck require to be obtained simultaneously; and therefore, a large quantity of sensors need to be arranged on the entire deck, and at the same time the road needs to be closed, causing high costs and low efficiency. To solve the difficulty, CN102353509B proposes "RAPID INSPECTION METHOD FOR MEDIUM AND SMALL BRIDGES BASED ON IMPACT VIBRATION TEST OF BLOCKS". The method is used to inspect the medium and small bridges from the road network to find the ones with serious shortage of bearing capacity, so as to provide objects for specific bearing capacity evaluation. However, the inspection method still has defects that measurement points which are arranged at boundaries between test sub-blocks, i.e., reference points, are needed. As a result, arrangement of measurement points is not flexible. Moreover, acceleration data of two different sub-blocks needs to be acquired for reference points. Therefore, testing efficiency further needs to be improved.

In evaluating the bearing capacity of the bridge, currently used measures mainly include manual inspection based on large loaded vehicles and structural health monitoring based on environmental vibration. However, the methods both have respective defects. In the manual inspection based on large loaded vehicles, during load testing, large vehicles need to be loaded on deck. This requires coordination of multiple departments and a large amount of labor needs to be organized. In addition, this load testing has the safety risk.

In the structural health monitoring based on environmental vibration, natural ambient conditions such as wind, sea waves, traffic flows are mainly used to excite the bridge, no excitation set is required, and the normal use of the structure is not affected. The structural health monitoring based on environmental vibration is currently applied to various large bridges all over the world, such as the Golden Gate Bridge in the United States, the Humber Bridge in the United Kingdom, and the Su Tong Yangtze River Highway Bridge. However, this monitoring method usually requires the arrangement of a large quantity of sensors on the bridge, and relatively expensive monitoring system is used, leading to high monitoring costs.

SUMMARY OF THE INVENTION

In views of the deficiencies in the existing methods and techniques above, the present invention provides a bridge inspection and evaluation method based on impact vibration. The objective is to realize low-cost and highly efficient inspection and evaluation of all medium and small bridges in the road network.

To achieve the foregoing objective, the technical solution adopted in the present invention is as follows:

A bridge inspection and evaluation method based on impact vibration includes backward analysis of the bridge based on impact on blocks without reference points and forward analysis of the bridge based on progressive impact loading, where the backward analysis of the bridge based on impact on blocks without reference points is used to rapidly inspect the medium and small bridges from the road network to find the ones with serious shortage of bearing capacity, and the forward analysis of the bridge based on progressive impact loading is used to evaluate the actual bearing capacity of the bridges which may have good safety condition in the backward analysis.

An impact test on blocks without reference points is used in the backward analysis of the bridge based on impact on blocks without reference points, and specifically includes: dividing the overall structure of the bridge into several sub-blocks, where locations of impact points and measurement points in different sub-blocks are selected independently, performing point-by-point impact on the impact points in each sub-block, and at the same time acquiring impact force time-history data of each sub-block and acceleration time-history data of the measurement points.

A flexibility identification method of the overall structure based on impact on divided blocks without reference points is used in the backward analysis of the bridge, and specifically includes: estimation of the frequency response function of the sub-block, identification of the modal parameters of the sub-block, scaling of modal shape of the sub-block, determination of the direction of modal shape of the sub-block, and calculation of the flexibility matrix of the overall structure.

In the flexibility identification method of the overall structure based on impact on blocks without reference points, during the modal shape scaling of sub-block, scaling degree of modal shape of sub-block $S_1$ is used as the standard to perform modal shape scaling on all the sub-blocks, and the formula is:

$$\{\tilde{\phi}_r^{S_k}\} = \eta_r^{S_k} \sqrt{\frac{Q_r^{S_k}}{Q_r^{S_1}}} \{\phi_r^{S_k}\},$$

where $\{\phi_r^{S_k}\}$ and $\{\tilde{\phi}_r^{S_k}\}$ are respectively $r^{th}$ modal shapes of the sub-block $S_k$ before and after modal shape scaling, $Q_r^{S_k}$ is scaling coefficient of the $r^{th}$ modal shape of the sub-block $S_k$ before modal shape scaling, $Q_r^{S_1}$ is scaling coefficient of $r^{th}$ modal shape of the sub-block $S_1$, and $\eta_r^{S_k}$ direction coefficient of the $r^{th}$ modal shape of the sub-block $S_k$ ($\eta_r^{S_k}=+1$ or $\eta_r^{S_k}=-1$); and subsequently, the scaled modal shapes of all the sub-blocks $S_1, S_2, \ldots, S_k, \ldots,$ and $S_n$ are integrated into the modal shape of the overall structure of the bridge, and the formula is:

$$\{\tilde{\phi}_r\} = \left(\{\tilde{\phi}_r^{S_1}\}^T \{\tilde{\phi}_r^{S_2}\}^T \cdots \{\tilde{\phi}_r^{S_k}\}^T \cdots \{\tilde{\phi}_r^{S_n}\}^T\right)^T$$

$$= \left(\{\phi_r^{S_1}\}^T \; \eta_r^{S_2}\sqrt{\frac{Q_r^{S_2}}{Q_r^{S_1}}}\{\phi_r^{S_2}\}^T \cdots \eta_r^{S_k}\sqrt{\frac{Q_r^{S_k}}{Q_r^{S_1}}}\{\phi_r^{S_k}\}^T \cdots \eta_r^{S_n}\sqrt{\frac{Q_r^{S_n}}{Q_r^{S_1}}}\{\phi_r^{S_n}\}^T\right)^T$$

where $\{\tilde{\phi}_r\}$ is the $r^{th}$ modal shape of the overall structure of the bridge determined by using the scaling degree of the modal shape of the sub-block $S_1$.

In the flexibility identification method of the overall structure based on impact on blocks without reference points, during the calculation of flexibility matrix of the overall structure, the potential energy of the overall structure of the bridge is first calculated, direction coefficient of the modal shape of each sub-block which corresponds to the minimum potential energy is then obtained, and the modal shape of the overall structure of the bridge is obtained based on the coefficient, where an expression of the potential energy of the overall structure of the bridge which includes the direction coefficient of the modal shape of each sub-block is:

$$\Pi_p = -\frac{1}{2}\sum_{r=1}^m \left(\{f^{S_1}\}^T\{\phi_r^{S_1}\} + \{f^{S_2}\}^T\{\phi_r^{S_2}\}\eta_r^{S_2}\sqrt{\frac{Q_r^{S_2}}{Q_r^{S_1}}} + \right.$$
$$\left. \cdots + \{f^{S_k}\}^T\{\phi_r^{S_k}\}\eta_r^{S_k}\sqrt{\frac{Q_r^{S_k}}{Q_r^{S_1}}} + \cdots + \{f^{S_n}\}^T\{\phi_r^{S_n}\}\eta_r^{S_n}\sqrt{\frac{Q_r^{S_n}}{Q_r^{S_1}}}\right)^2$$
$$\left(\frac{Q_r^{S_1}}{-\lambda_r} + \frac{Q_r^{S_1*}}{-\lambda_r^*}\right)$$

where $\Pi_p$ is the potential energy of the overall structure of the bridge, $\{f^{S_k}\}$ represents the node load vector in any sub-block $S_k$, $\lambda_r$ is the $r^{th}$ system pole, $\lambda_r^*$ and $Q_r^{S_1*}$ are respectively conjugate complex numbers of $\lambda_r$ and $Q_r^{S_1}$, and m represents the maximum order number of calculation.

Progressive impact loading test is used in the forward analysis of the bridge based on progressive impact loading, and includes: selecting an impact loading point at the calculated static loading point; making the maximum impact load at each impact point equal to the corresponding calculated static load; grading the application of an impact load; using acceleration measurement points on the deflection control section as displacement measurement points and arranging displacement sensors at the displacement measurement points, measuring the maximum dynamic deflection at each displacement measurement point under the effect of the impact load, and after impact loading ends, and when the bridge is stable, then measuring residual deflection at the displacement measurement point; and deriving actual static deflections at the displacement measurement points of the bridge under the effect of the calculated static load, according to the correspondence between maximum dynamic deflection and static deflection, and assessing the bearing capacity of the bridge by using the actual static deflections and residual deflections at the displacement measurement points in conjunction with cracks and foundation displacements.

Beneficial effect: Compared with the prior art, the present invention has the following advantages:

(1) In the bridge inspection and evaluation method based on impact vibration provided in the present invention, in the stage of backward analysis, the medium and small bridges from the road network with serious shortage of bearing capacity are find to avoid safety hazards caused by the less or none of inspection. During the stage of forward analysis of the bridge, the defects in conventional inspection and monitoring methods are remedied, achieving highly efficient, safe, and low-cost evaluation of the bearing capacity of the bridge.

(2) The flexibility identification method of the overall structure based on impact on blocks without reference points in the present invention, compared with conventional flexibility identification method based on impact vibration on the overall structure of the bridge, a quantity of sensors required is greatly reduced. In addition, road closure is not required during the tests. Compared with the flexibility identification method of the overall structure based on impact on blocks with the reference points, in the present invention, the arrangement of measurement points is more flexible, and only acceleration time-history data of the current sub-block needs to be obtained at each measurement point, so that testing efficiency is improved.

(3) Compared with conventional static load testing based on the large loaded vehicle, progressive impact loading test in the present invention is not restricted by wheelbases of vehicles, requires fewer people, and has high efficiency and safety. In addition, it has low costs and simple operations as compared with structural health monitoring based on environmental vibration.

DETAILED DESCRIPTION OF THE INVENTION

The present invention is further described below with reference to the accompanying drawings.

The present invention mainly adopts impact vibration. Firstly, for the medium and small bridges in the road network, backward analysis is performed on the bridge based on impact on blocks without reference points, so as to rapidly find the ones with serious shortage of bearing capacity. Then, for the bridges may have good safety condition, forward analysis is performed on the bridge based on progressive impact loading, so as to economically and efficiently determine whether actual bearing capacity of the bridge satisfies requirement, achieving complete inspection and evaluation of the bridge. Based on the foregoing process, the present invention includes four parts in total.

Figure 1:
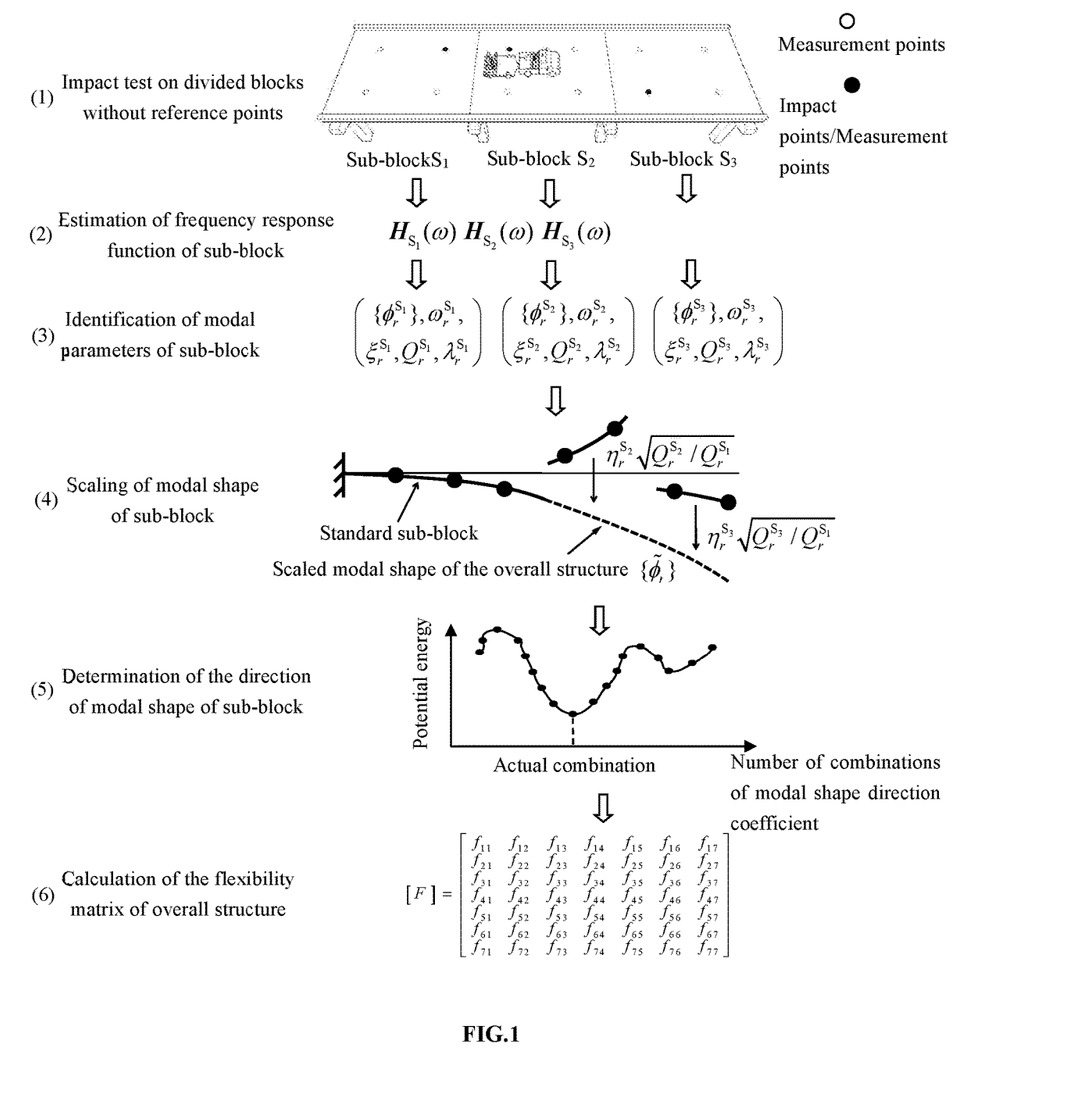
FIG. 1 is the schematic diagram of processes of an impact test on blocks without reference points and flexibility identification of the overall structure according to the embodiment of the present invention.

I. Impact Test on Divided Blocks without Reference Points and Flexibility Identification Method of the Overall Structure Based on Impact on Blocks without Reference Points To rapidly inspect the medium and small bridges from the road network to find the ones with serious shortage of bearing capacity, the present invention provides an impact test on blocks without reference points and flexibility identification method of the overall structure based on impact on blocks without reference points. The flexibility identification method of the overall structure includes: estimation of the frequency response function of the sub-block, identification of the modal parameters of the sub-block, scaling of modal shape of the sub-block, determination of the direction of modal shape of the sub-block, and calculation of the flexibility matrix of the overall structure. In FIG. 1, a simply supported girder bridge including three sub-blocks is used as an example, and processes of the impact test on blocks without reference points and the flexibility identification of the overall structure are presented. The processes specifically include:

(1) Impact Test on Blocks without Reference Points

Figure 2:
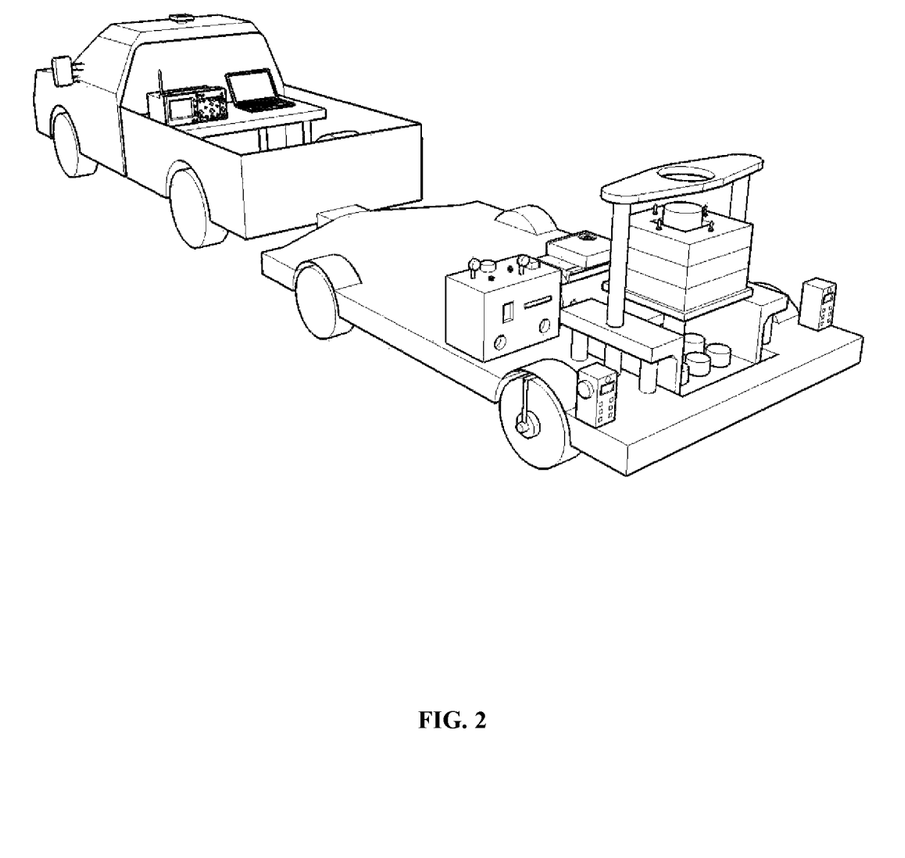
FIG. 2 is the schematic diagram of vehicle-mounted exciter according to the embodiment of the present invention.

According to the scale of the bridge and test accuracy, the overall structure of the bridge is divided into sub-block $S_1$, sub-block $S_2$, ..., sub-block $S_k$, ..., and sub-block $S_n$, and locations of impact points and measurement points in each sub-block are arranged. The locations of impact points and measurement points in different sub-blocks are selected independently. Impact is performed by the vehicle-mounted exciter, which is shown in FIG. 2, on one impact point in one sub-block, and impact force time-history data and acceleration time-history data of all measurement points in the sub-block are acquired at the same time. After impact on one point is completed, impact is performed on other impact points in the same sub-block to complete an impact test of one sub-block. The foregoing work is repeated to perform impact tests on the rest sub-blocks sequentially, until finally the impact test work on the entire bridge is completed.

(2) Estimation of the Frequency Response Function of Sub-Block

After windowing and filtering are performed on impact force time-history data of each sub-block and acceleration time-history data of measurement points, frequency response functions $H_{S1}(\omega)$, $H_{S2}(\omega)$, ..., $H_{Sk}(\omega)$, ..., and $H_{Sn}(\omega)$ of sub-blocks are estimated respectively.

(3) Identification of the Modal Parameters of Sub-Block

Modal parameters of sub-blocks are respectively identified according to the frequency response functions of the sub-blocks and by using modal parameters identification algorithm (for example, CMIF method, and PolyMAX method). Parameters identified from any sub-block $S_k$ include: $r^{th}$ modal shape $\{\phi_r^{S_k}\}$ and corresponding frequency $\omega_r^{S_k}$, damping ratio $\xi_r^{S_k}$, modal scaling coefficient $Q_r^{S_k}$, and system pole $\lambda_r^{S_k}$, where r=1, 2, ..., and m.

(4) Modal Shape Scaling of Sub-Block

Because sub-blocks in the same-order frequency have different ratios of modal shape scaling, when modal shapes of sub-blocks are fused, a uniform scaling standard needs to be used to scale the modal shape of each sub-block. Any sub-block $S_k$ is first selected. According to the fact that the residue matrix of the structure in the same-order remains unchanged before and after modal shape scaling, it is obtained that:

$$\{\phi_r^{S_k}\}\{\phi_r^{S_k}\}^T Q_r^{S_k} = \{\tilde{\phi}_r^{S_k}\}\{\tilde{\phi}_r^{S_k}\}^T \tilde{Q}_r^{S_k} \quad (1)$$

where $\{\phi_r^{S_k}\}$ and $\{\tilde{\phi}_r^{S_k}\}$ are respectively $r^{th}$ modal shapes of sub-block $S_k$ before and after modal shape scaling, and $Q_r^{S_k}$ and $\tilde{Q}_r^{S_k}$ are respectively scaling coefficients of the $r^{th}$ modal shapes of the sub-block $S_k$ before and after modal shape scaling. Then, it is assumed that the scaling coefficient of modal shape is $x_k$, namely:

$$\{\tilde{\phi}_r^{S_k}\} = x_k \{\phi_r^{S_k}\} \quad (2)$$

Let all sub-blocks use scaling level of the sub-block $S_1$ as standard, that is:

$$\tilde{Q}_r^{S_k} = Q_r^{S_1} \quad (3)$$

The formulas (2) and (3) are substituted into the formula (1) to obtain:

$$x_k = \eta_r^{S_k} \sqrt{\frac{Q_r^{S_k}}{Q_r^{S_1}}} \quad (4)$$

where $\eta_r^{S_k}$ is direction coefficient of the $r^{th}$ modal shape of the sub-block $S_k$, and $\eta_r^{S_k} = +1$ or $\eta_r^{S_k} = -1$. The formula (4) is substituted into the formula (2) to obtain:

$$\{\tilde{\phi}_r^{S_k}\} = \eta_r^{S_k} \sqrt{\frac{Q_r^{S_k}}{Q_r^{S_1}}} \{\phi_r^{S_k}\} \quad (5)$$

Scaling is performed on the modal shape of each sub-block according to the foregoing process, to obtain the scaled modal shape of the overall structure as follows:

$$\{\tilde{\phi}_r\} = \left(\{\tilde{\phi}_r^{S_1}\}^T \{\tilde{\phi}_r^{S_2}\}^T \cdots \{\tilde{\phi}_r^{S_k}\}^T \cdots \{\tilde{\phi}_r^{S_n}\}^T\right)^T \quad (6)$$

$$= \left(\{\phi_r^{S_1}\}^T \; \eta_r^{S_2}\sqrt{\frac{Q_r^{S_2}}{Q_r^{S_1}}}\{\phi_r^{S_2}\}^T \cdots \eta_r^{S_k}\sqrt{\frac{Q_r^{S_k}}{Q_r^{S_1}}}\{\phi_r^{S_k}\}^T \cdots \right.$$

-continued $$\left. \eta_r^{S_n} \sqrt{\frac{Q_r^{S_n}}{Q_r^{S_1}}} \{\phi_r^{S_n}\}^T \right)^T$$

(5) Determination of Direction of Modal Shape of Sub-Block

After modal shape scaling, the sign of direction coefficient of modal shape still cannot be determined. Therefore, before modal shapes of sub-blocks are fused, the direction of the modal shape of each sub-block further needs to be determined. According to the principle of minimum potential energy, it can be known that the displacement corresponding to the correct direction of the modal shape can minimize the potential energy of the overall structure. Therefore, direction coefficient of modal shape of each sub-block which corresponds to the minimum potential energy is an actual value. The scaled modal shape of each sub-block may be completely determined based on the actual value. Subsequently, through integration, the correct modal shape of the overall structure may be obtained. First, an expression of the potential energy of the overall structure is introduced:

$$\Pi_p = \frac{1}{2}\{\delta\}^T [K]\{\delta\} - \{\delta\}^T \{f\} \quad (7)$$

where $\Pi_p$ is the potential energy of the overall structure, $[K]$ is the rigidity matrix of the structure, $\{\delta\}$ is the displacement vector of structural node, and $\{f\}$ is the node load vector of the structure. In the state of structural balance, an expression of displacement of the structure node is:

$$\{\delta\} = [F]\{f\} \quad (8)$$

where $[F]$ is the flexibility matrix of the overall structure, expressed by:

$$[F] = \sum_{r=1}^{m} \left( \frac{\{\tilde{\phi}_r\}\{\tilde{\phi}_r\}^T Q_r^{S_1}}{-\lambda_r} + \frac{\{\tilde{\phi}_r^*\}\{\tilde{\phi}_r^*\}^T Q_r^{S_1*}}{-\lambda_r^*} \right) \quad (9)$$

where $\{\tilde{\phi}_r^*\}$ is the conjugate vector of $\{\tilde{\phi}_r\}$, $\lambda_r^*$ and $Q_r^{S_1*}$ are respectively conjugate complex numbers of $\lambda_r$ and $Q_r^{S_1}$, and m represents maximum order number of calculation. The formulas (8) and (9) are substituted into the formula (7) and arrangement is performed to obtain:

$$\Pi_p = -\frac{1}{2}\{f\}^T \left[ \sum_{r=1}^{m} \left( \frac{\{\tilde{\phi}_r\}\{\tilde{\phi}_r\}^T Q_r^{S_1}}{-\lambda_r} + \frac{\{\tilde{\phi}_r^*\}\{\tilde{\phi}_r^*\}^T Q_r^{S_1*}}{-\lambda_r^*} \right) \right]\{f\} \quad (10)$$

Because the structure of the bridge is small-damping structure, the identified modal shapes all are real mode, and $\{\tilde{\phi}_r^*\} = \{\tilde{\phi}_r\}$. The formula (10) is simplified to obtain:

$$\Pi_p = -\frac{1}{2} \sum_{r=1}^{m} \left[ (\{f\}^T \{\tilde{\phi}_r\})^2 \left( \frac{Q_r^{S_1}}{-\lambda_r} + \frac{Q_r^{S_1*}}{-\lambda_r^*} \right) \right] \quad (11)$$

A node load vector of the overall structure is:

$$\{f\} = (\{f^{S_1}\}^T \{f^{S_2}\}^T \ldots \{f^{S_k}\}^T \ldots \{f^{S_n}\}^T)^T \quad (12)$$

where $\{f^{S_k}\}$ represents node load vector in any sub-block $S_k$. The formula (6) and the formula (12) are substituted into the formula (11) and expansion is performed to obtain:

$$\Pi_p = -\frac{1}{2} \sum_{r=1}^{m} \left( \{f^{S_1}\}^T \{\phi_r^{S_1}\} + \{f^{S_2}\}^T \{\phi_r^{S_2}\} \eta_r^{S_2} \sqrt{\frac{Q_r^{S_2}}{Q_r^{S_1}}} + \right.$$

$$\left. \cdots + \{f^{S_k}\}^T \{\phi_r^{S_k}\} \eta_r^{S_k} \sqrt{\frac{Q_r^{S_k}}{Q_r^{S_1}}} + \cdots + \{f^{S_n}\}^T \{\phi_r^{S_n}\} \eta_r^{S_n} \sqrt{\frac{Q_r^{S_n}}{Q_r^{S_1}}} \right)^2 \quad (13)$$

$$\left( \frac{Q_r^{S_1}}{-\lambda_r} + \frac{Q_r^{S_1*}}{-\lambda_r^*} \right)$$

The potential energy of the overall structure is calculated using the formula (13). The direction coefficient of the modal shape of each sub-block which corresponds to the minimum potential energy value is an actual value.

(6) Calculation of Flexibility Matrix of the Overall Structure

After the direction coefficient of the modal shape of each sub-block is obtained, the modal shape of the overall structure may be obtained by substituting the direction coefficient into the formula (6), so as to achieve fusion of modal shapes of the sub-blocks. The flexibility matrix of the overall structure may then be calculated using the formula (9). The bridge deflection may be predicted by using the matrix. Then, safety investigation of the bridge may be achieved by comparing the predicted deflection value with the theoretically calculated value.

II. Progressive Impact Loading Test

For the bridge which is determined to have good safety condition in the backward analysis, actual bearing capacity of the bridge further needs to be evaluated. During the evaluation of the bearing capacity, the load needs to be applied on the bridge. The present invention provides progressive impact loading test, which is used to implement loading on the bridge. The test mainly includes the following steps:

(1) Selection of the Maximum Impact Load

In the progressive impact loading test, an impact load is used to replace the conventional static vehicle load. An impact loading point is selected at the calculated static loading point, and the maximum impact load at each impact loading point is made equal to the corresponding calculated static load.

(2) Grading of Impact Loads

To obtain the relationship curve between an impact load and the deflection caused by the impact load and to prevent accidental damage to the structure, the application of an impact load is graded. The number of grades of impact loading is determined according to the maximum impact load and the minimum loading increment.

(3) Deflection Measurement

Acceleration measurement points on the deflection control section are also used as displacement measurement points and displacement sensors are arranged at the displacement measurement points, the maximum dynamic deflection at each displacement measurement point under the effect of the impact load is measured, and after impact loading ends and when the bridge is stable, the residual deflection at the displacement measurement point is measured.

(4) Result Analysis

Actual static deflections at the displacement measurement points of the bridge under the effect of the calculated static load are derived according to the correspondence between the maximum dynamic deflection and static deflection, and the bearing capacity of the bridge is assessed by using the actual static deflections and residual deflections at the displacement measurement points in conjunction with cracks and foundation displacements.

III. Bridge Inspection and Evaluation Process Based on Impact Vibration

Figure 3:
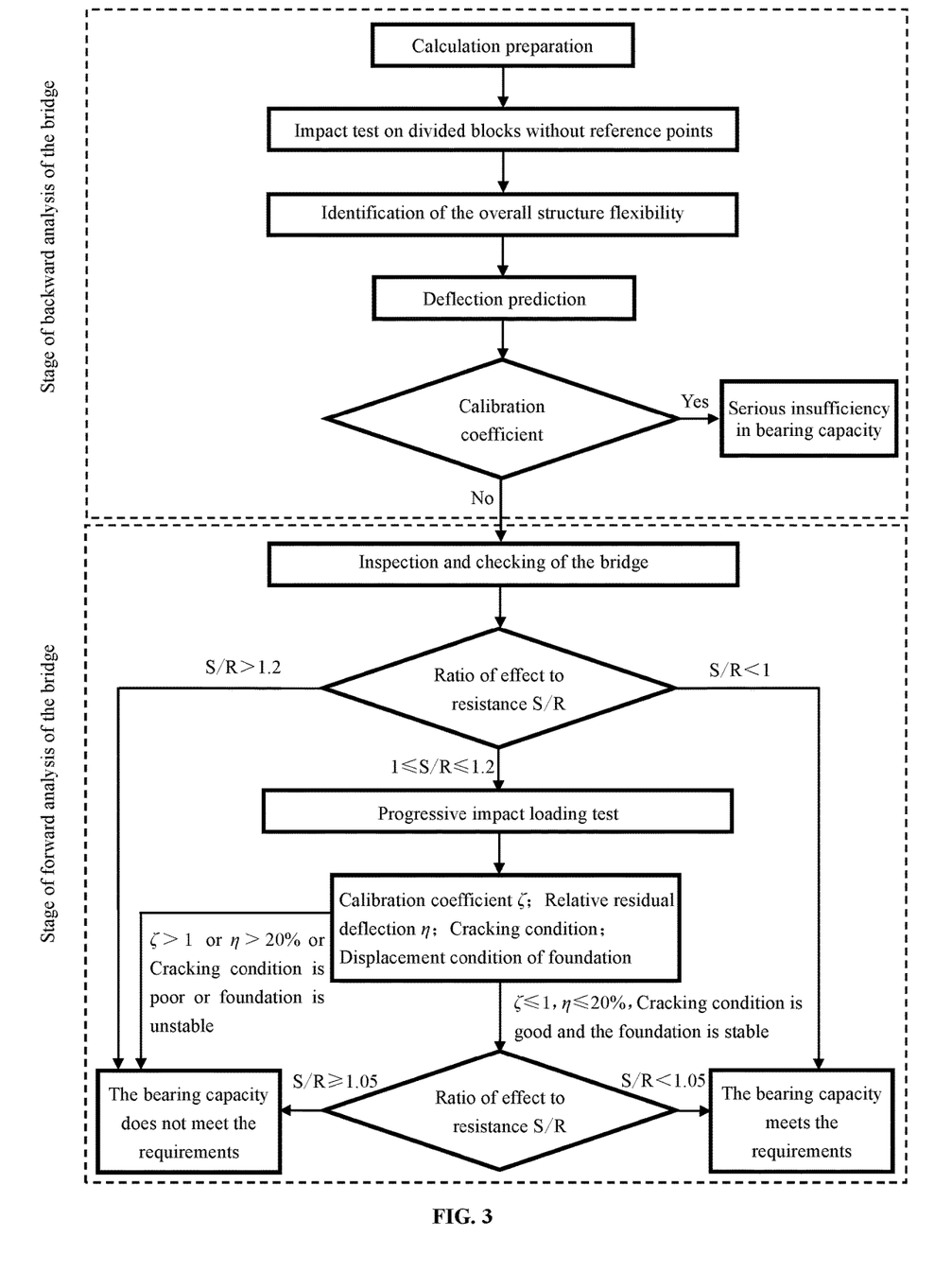
FIG. 3 is the flowchart of bridge inspection and evaluation based on impact vibration according to an embodiment of the present invention.

By combining the foregoing items I, and II of the invention with related evaluation methods, bridge inspection and evaluation process based on impact vibration is formed. As shown in FIG. 3, the process includes backward analysis of the bridge based on impact on blocks without reference points and forward analysis of the bridge based on progressive impact loading. Main steps of the process are as follows:

Step 1: Calculation Preparation

First, design load is determined according to the class of the road, so as to further determine the deflection control section and controlled deflection of the bridge. Then according to the scale of the bridge to be tested and the test accuracy, the bridge is properly divided into sub-blocks, and locations of impact points and acceleration measurement points are arranged. The impact points should be selected at structurally sensitive positions, and the acceleration measurement points should include the impact points and the points at the deflection control section. These acceleration measurement points at the deflection control section are also used as the displacement measurement points. Then the effect point and value of the calculated static load are determined. The effect point of the calculated static load should be selected from the measurement points and is suitably selected to be close to peak values of deflection influence lines of the control section. The value of the effect point should ensure that the calculated deflection value on the control section after calculation of loads satisfies the testing efficiency requirement.

Step 2: Impact Test on Blocks without Reference Points

Impact equipment is moved to the sub-block deck, and the accelerometers are set on the measurement points of the sub-block. Then, the impact point was impacted, at the same time, the signal of impact force and accelerations are received. After impact on one point is completed, impact is performed on other impact points in the same sub-block to complete an impact test of one sub-block. Impact tests are similarly performed sequentially on the rest sub-blocks, until finally the impact test work on the entire bridge is completed.

Step 3: Flexibility Identification of the Overall Structure Based on Impact on Blocks without Reference Points The frequency response function of each sub-block is estimated according to impact force time-history data of each sub-block and the acceleration time-history data of the measurement points. The modal parameters identification algorithm is used to respectively identify modal parameters of each sub-block. The modal parameters include modal shape, frequency, damping ratio, modal scaling coefficient, and system pole. After modal shape scaling, to determine the sign of the direction coefficient of modal shape of each sub-block, the formula (13) is used to calculate potential energy of the overall structure. The direction coefficient of modal shape of each sub-block which corresponds to the minimum potential energy value is the actual value. The modal shape of the overall structure may be obtained by substituting the actual value into the formula (6). The flexibility matrix of the overall structure may then be calculated using the formula (9).

Step 4: Preliminary Determination of the Safety Condition of the Bridge

The deflection at displacement measurement point on the control section is predicted according to the calculated static load and the flexibility matrix of the overall structure of the bridge. The predicted deflection value is compared with the calculated deflection value at the displacement measurement point. If the predicted value is greater than the calculated value, that is, the calibration coefficient 1, it is indicated that the actual condition of the bridge is worse than the theoretical condition, and the bearing capacity of the bridge is seriously insufficient. Otherwise, it is considered that the bridge is in good safety condition and the evaluation of actual bearing capacity further needs to be performed.

Step 5: Bridge Inspection and Checking

For the bridge in the good safety condition, the impact of factors such as actual defects and material conditions on the bearing capacity of the bridge further needs to be considered. Therefore, related indices of the bridge need to be examined and inspected. Then action effect and resistance effect are compared by considering the foregoing indices, so as to perform checking and assessment. When the ratio of the action effect to the resistance effect is less than 1, it is determined that the bearing capacity satisfies requirement. If the ratio is greater than 1.2, it is determined that the bearing capacity does not satisfy requirement. If the ratio is between 1.0 and 1.2, progressive impact loading test should be performed.

Step 6: Solution Formulation of Progressive Impact Loading Test

An impact loading point is selected at the calculated static loading point, and the maximum impact load at each impact loading point is made equal to corresponding calculated static load. During loaded testing, the application of an impact load needs to be graded. The number of grades of impact loading is determined according to the maximum impact load and the minimum loading increment.

Step 7: Performance of Progressive Impact Loading Test

Impact equipment is moved to the impact loading point, and displacement sensors are arranged at the displacement measurement points. The impact point was impacted at the same time acquires data of dynamic deflections of the displacement measurement points which is transmitted by the displacement sensors is received. After one loading ends, an impact load is progressively increased, until finally the maximum dynamic deflection at the displacement measurement point on the control section under the effect of the maximum impact load is obtained. After impact loading ends, and when the bridge is stable, values of residual deflections at the displacement measurement points which are transmitted by the displacement sensor are acquired. In the progressive impact loading test, cracks and foundation displacements also need to be examined.

Step 8: Assessment of the Bearing Capacity of the Bridge

According to the correspondence between the maximum dynamic deflection and the static deflection, actual static deflections of the bridge at the displacement measurement points under the effect of the calculated static load are derived. Then the calibration coefficient of load testing, i.e., the ratio of an actual static deflection value to calculated deflection value and relative residual deflection value are calculated. If the calibration coefficient $\zeta$ is greater than 1, the relative residual deflection value $\eta$ exceeds 20%, the cracking condition is poor, or the foundation is unstable and settles, it is determined that the bearing capacity does not satisfy requirement. Otherwise, according to the calibration coefficient, checking coefficient is determined again, and an action effect and resistance effect are compared based on the checking coefficient. When the ratio of the action effect to the resistance effect is less than 1.05, it is determined that the bearing capacity of the bridge satisfies the requirement. Otherwise, it is determined that the bearing capacity does not satisfy the requirement.

Embodiment

Figure 4:
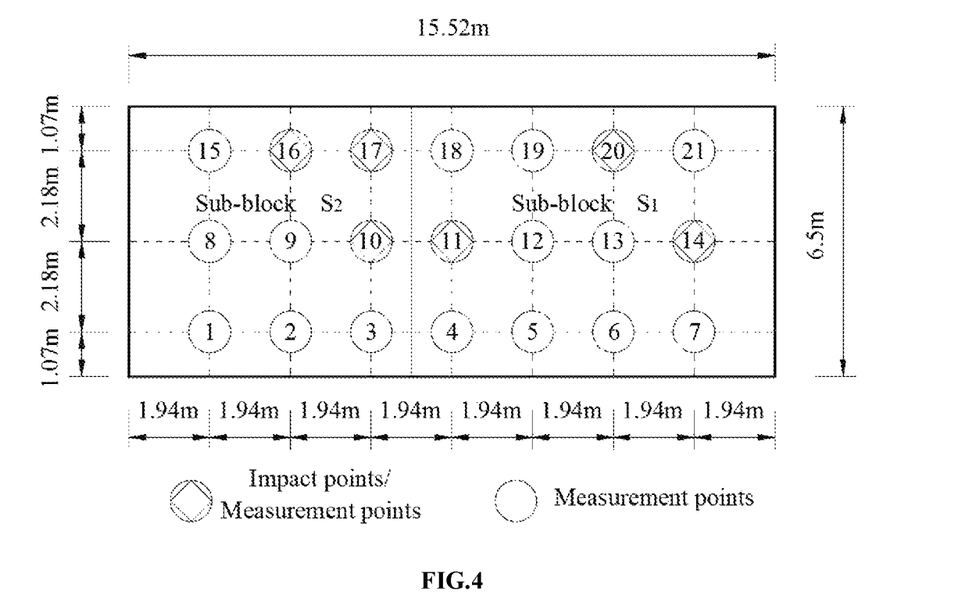
FIG. 4 is the schematic diagram of sub-block division of bridge and selection of locations of measurement points and impact points according to an embodiment of the present invention.

The present invention is further described below by reference to a specific embodiment. However, the protection scope of the present invention is not limited thereto. A single-span simply-supported-beam bridge is used as an example. As shown in FIG. 4, the span of the bridge is 15.52 m. The width of the entire deck is 6.5 m. The bridge has bidirectional two-lane road, and two footpaths which are respectively 1.07 m wide are provided on two sides of the lanes. The distance between simply supported beams below the deck of the bridge is 2.18 m. According to the present invention, the bridge is tested and the bearing capacity of the bridge is evaluated, and results are compared with results of the conventional method based on an impact vibration test of the overall structure of the bridge. The specific steps are as follows:

(1) Calculation Preparation

According to the design load, the mid-span section of the bridge is determined as deflection control section. The value of controlled deflection of the section is 5.6 mm. Then the entire bridge is divided into sub-block $S_1$ and sub-block $S_2$. The sub-block $S_1$ includes acceleration measurement points 4, 5, 6, 7, 11, 12, 13, 14, 18, 19, 20, and 21 and impact points 11, 14, and 20. The sub-block $S_2$ includes acceleration measurement points 1, 2, 3, 8, 9, 10, 15, 16, and 17 and impact points 10, 16, and 17. The points 10, 11, 14, 16, 17, and 20 are used as both acceleration measurement points and impact points. The points 4, 11, and 18 are at the deflection control section, and therefore the points 4, 11, and 18 are used as both acceleration measurement points and displacement measurement points. Sub-block division of the bridge and locations of measurement points and impact points are shown in FIG. 4. According to deflection influence lines of the mid-span section, calculated static loading points are selected to be 11, 12, 18, and 19. Calculated static loads corresponding to the static loading points 11, 12, 18, and 19 are respectively 150 kN, 50 kN, 150 kN, and 50 kN. The maximum calculated deflection value of the mid-span section which is caused by the calculated static loads is 5.5 mm, located at the displacement measurement point 11. The load efficiency of the bridge satisfies requirement.

(2) Impact Test on Blocks without Reference Points

Impact equipment is moved to the sub-block S1 deck, and the accelerometers are set on the measurement points of the sub-block. Firstly, impact point 14 is impacted, at the same time, the data of impact force and accelerations are received. After that, impact points 20 and 11 are impacted respectively, thereby the impact of sub-block S1 is finished. Sub-block S2 is impacted as the same way of S1. At last, the impact test of the whole bridge is completed.

(3) Flexibility Identification of the Overall Structure Based on Impact on Blocks without Reference Points The acquired impact force time-history data and acceleration time-history data of measurement points of the sub-block S1 and the sub-block $S_2$ are windowed and filtered to estimates the frequency response function of each sub-block, and CMIF method is used to perform modal parameter identification on the obtained frequency response function. The identified frequencies of the first 10 orders of the two sub-blocks and corresponding damping ratios are listed in Table 1. Additionally, the frequencies and damping ratios of the overall structure of the bridge obtained by the conventional method based on an impact vibration test of the overall structure of the bridge are also provided in Table 1 for comparison. As seen from Table 1 that in the same order, the frequency of sub-block is very close to the frequency of the overall structure, indicating that parameter identification is accurate.

TABLE 1

Identified values of frequencies of the first 10 orders and damping ratios

| | Overall structure | | Sub-block $S_2$ | | Sub-block $S_1$ | |
|---|---|---|---|---|---|---|
| Mode number | Frequency (Hz) | Damping ratio (%) | Frequency (Hz) | Damping ratio (%) | Frequency (Hz) | Damping ratio (%) |
| 1st | 7.16 | 6.53 | 7.25 | 7.91 | 7.13 | 5.71 |
| 2nd | 8.26 | 5.24 | 8.25 | 4.58 | 8.22 | 6.20 |
| 3rd | 10.14 | 1.38 | 10.12 | 1.38 | 10.14 | 1.32 |
| 4th | 14.71 | 1.76 | 14.68 | 1.65 | 14.70 | 1.86 |
| 5th | 20.76 | 0.56 | 20.57 | 0.31 | 20.80 | 0.66 |
| 6th | 22.85 | 0.97 | 22.78 | 1.08 | 22.82 | 0.93 |
| 7th | 26.50 | 4.04 | 26.57 | 3.92 | 26.64 | 4.23 |
| 8th | 30.01 | 2.11 | 30.07 | 2.08 | 29.95 | 2.33 |
| 9th | 33.99 | 1.63 | 33.98 | 1.84 | 33.89 | 1.57 |
| 10th | 35.74 | 1.53 | 35.89 | 1.66 | 35.43 | 2.04 |

Modal shape scaling is then performed. Because the number of measurement points in the sub-block $S_2$ is less than that in the sub-block $S_1$, scaling level of the sub-block $S_1$ is used as standard. It is obtained through the formula (5) that an $r^{th}$ modal shape of the sub-block $S_2$ after modal shape scaling is:

$$\{\tilde{\phi}_r^{S_2}\} = \eta_r^{S_2} \sqrt{\frac{Q_r^{S_2}}{Q_r^{S_1}}} \{\phi_r^{S_2}\}.$$

The scaled modal shape of the overall structure may be obtained by substituting the above formula into the formula (6), and is as follows:

$$\{\tilde{\phi}_r\} = \left(\{\tilde{\phi}_r^{S_1}\}^T \{\tilde{\phi}_r^{S_2}\}^T\right)^T = \left(\{\phi_r^{S_1}\}^T \eta_r^{S_2} \sqrt{\frac{Q_r^{S_2}}{Q_r^{S_1}}} \{\phi_r^{S_2}\}^T\right)^T.$$

To determine the sign of $\eta_r^{S_2}$, the node load of 5 kN is applied at each measurement point of the overall structure, namely:

$$\{f\} = (\{f^{S_1}\}^T \{f^{S_2}\}^T)^T = ((5\ 5\ \ldots\ 5)_{1\times 21})^T \times 10^3\ N.$$

It may be obtained using the formula (13) that:

$$\Pi_p = -\frac{1}{2}\sum_{r=1}^{10}\left(\{f^{S_1}\}^T\{\phi_r^{S_1}\} + \{f^{S_2}\}^T\{\phi_r^{S_2}\}\eta_r^{S_2}\sqrt{\frac{Q_r^{S_2}}{Q_r^{S_1}}}\right)^2\left(\frac{Q_r^{S_1}}{-\lambda_r} + \frac{Q_r^{S_1*}}{-\lambda_r^*}\right).$$

Figure 5:
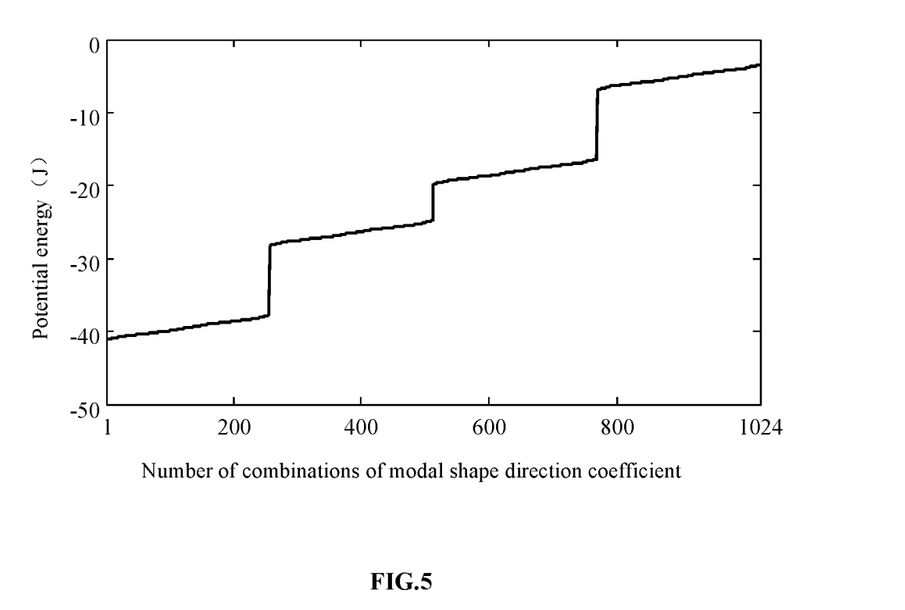
FIG. 5 is the line chart of sorting of potential energy according to the embodiment of the present invention.
Figure 6:
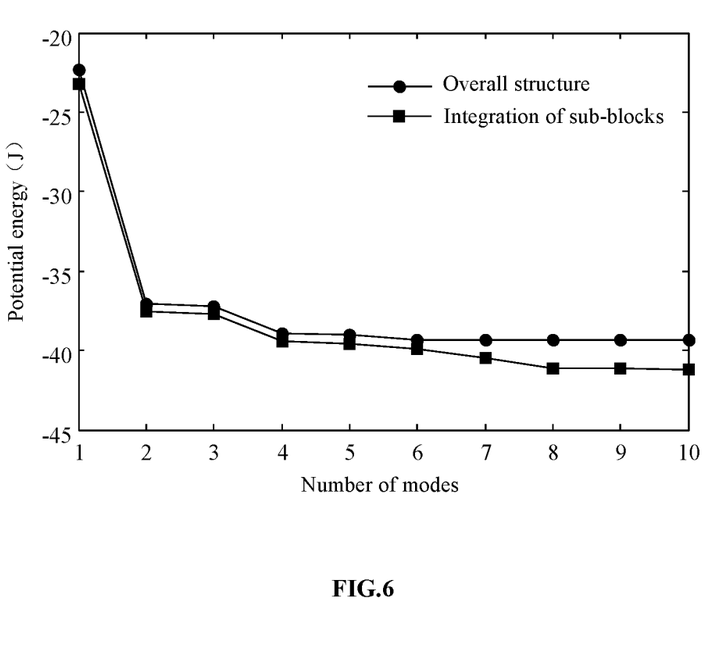
FIG. 6 is the line chart of comparison of potential energy according to the embodiment of the present invention.
Figure 7:
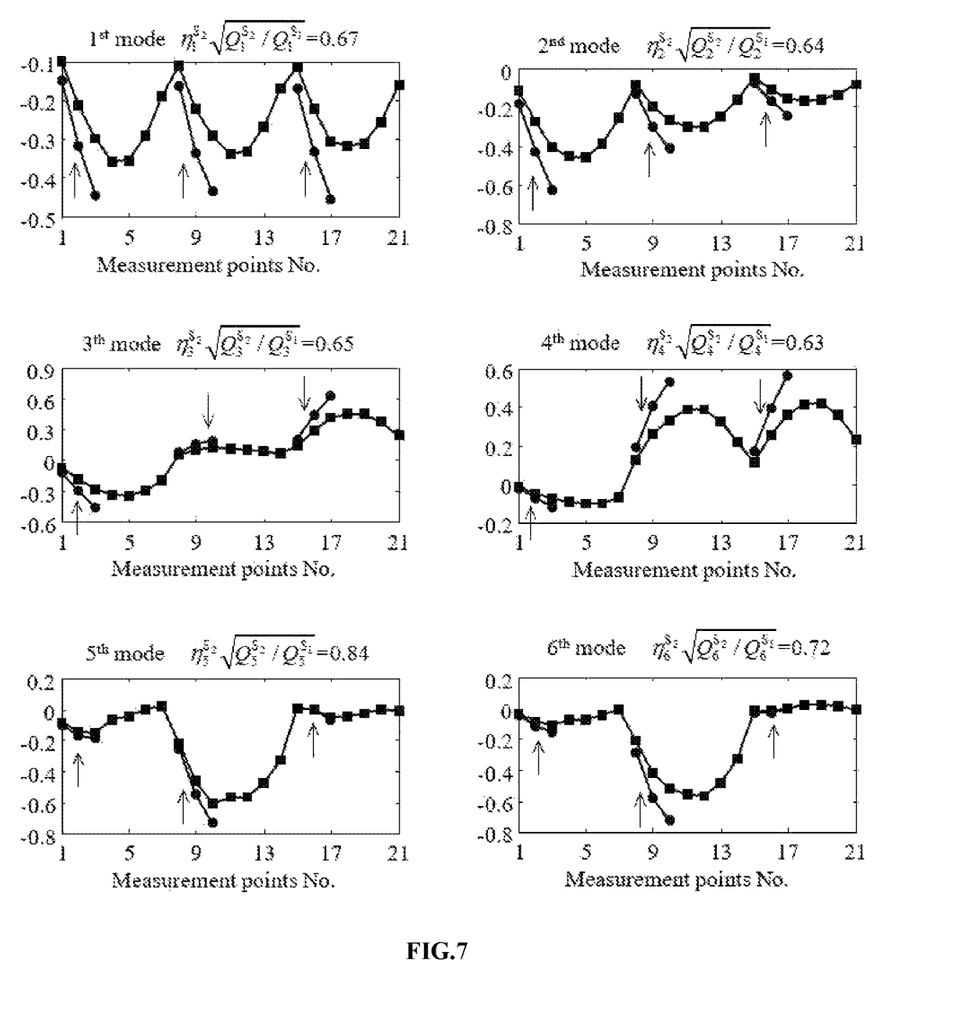
FIG. 7 is the schematic diagram of modal shape scaling of the first 6 orders according to the embodiment of the present invention.

The node load is substituted into the above formula to calculate the potential energy of the overall structure. Because modal shapes of 10 orders are used, there are $2^{10}$=1024 values of the potential energy. The values are shown in FIG. 5 in ascending order. The direction coefficient of modal shape of the sub-block $S_2$ which corresponds to minimum potential energy is an actual value. The $r^{th}$ modal shape of the sub-block $S_2$ after modal shape scaling may be obtained from the actual value. The potential energy of the overall structure is calculated order by order according to scaled modal shapes, and the values of the potential energy are compared with those calculated by the conventional method based on an impact vibration test of the overall structure of the bridge in FIG. 6. It can be seen from FIG. 6 that when the mode number is 6, the potential energy already converges. The scaling of modal shapes of the first 6 orders of the sub-block $S_2$ is provided in FIG. 7. The flexibility matrix of the overall structure which is calculated by introducing the first 6 orders is as follows:

$$[F] = \sum_{r=1}^{6} \left( \frac{\{\tilde{\phi}_r\}\{\tilde{\phi}_r\}^T Q_r^{S_1}}{-\lambda_r} + \frac{\{\tilde{\phi}_r^*\}\{\tilde{\phi}_r^*\}^T Q_r^{S_1*}}{-\lambda_r^*} \right).$$

Calculation may be performed according to the above formula to obtain F.

(4) Preliminary Determination of the Safety Condition of the Bridge

Figure 8:
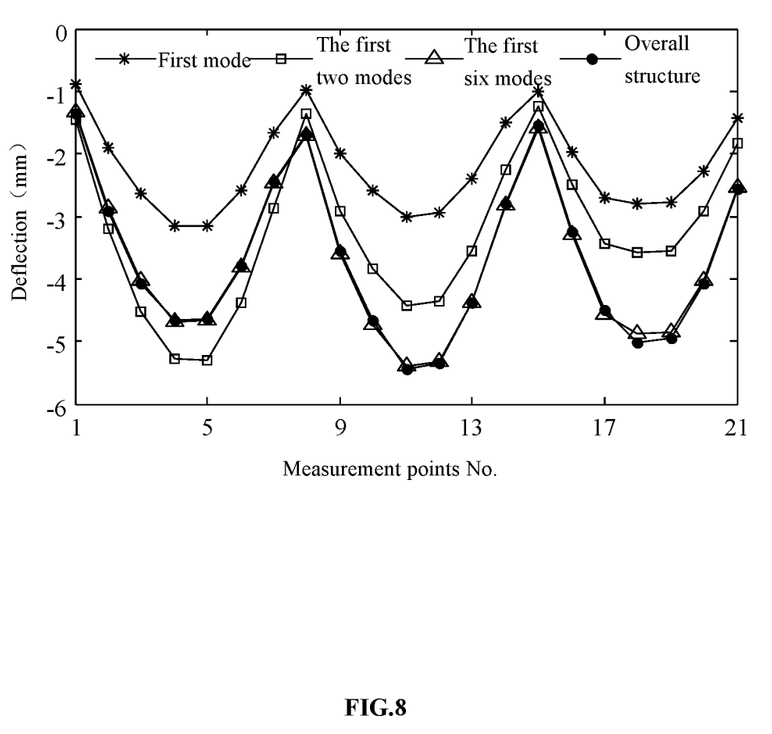
FIG. 8 is the line chart of predicted deflections according to the embodiment of the present invention.

Calculated static loads 150 kN, 50 kN, 150 kN, and 50 kN are respectively applied at points 11, 12, 18, and 19. The predicted deflection value of each measurement point may be obtained by using the foregoing flexibility matrix. To further present the accuracy of deflection prediction in the present invention, flexibility matrices obtained using modal parameters of the first 1 mode and the first 2 modes are further calculated, and corresponding deflections are respectively predicted. The three predicted deflection results are compared with predicted deflection values obtained under the effect of the same calculated load by the conventional method based on impact vibration test of the overall structure of the bridge. As shown in FIG. 8, it can be seen that as the mode number increases, the predicted deflection results tends to conform to the results obtained by the impact test of the overall structure, proving that the flexibility identification method in the present invention is accurate. The deflections calculated using the first 6 modes are used as predicted values. In the mid-span section, the maximum predicted deflection value is 5.4 mm, located at the displacement measurement point 11. Because the predicted value is less than calculated deflection value 5.5 mm, it is estimated that the actual condition of the bridge is better than theoretical condition. The bearing capacity of the bridge is further evaluated.

(5) Bridge Inspection and Checking

The actual defects, material conditions, and the like of the bridge are examined and inspected. The contents mainly include: defect conditions of the bridge, geometry, constant load variation conditions, material strength, rebar corrosion conditions, chlorine ion content of concrete, concrete resistivity, concrete carbonation conditions, the thickness of the rebar protection layer, the self-vibration frequency of the structure, foundation and ground conditions, actual operation load conditions, and so on. From the results of the foregoing examination and inspection, assessment scales of the indices are obtained, so as to obtain bearing capacity checking coefficient, bearing capacity deterioration coefficient, section reduction coefficient of concrete structure, section reduction coefficient of rebar, and live-load influence correction coefficient. After the foregoing coefficients are considered, the value of bending moment resistance of the mid-span section is 9795 kN·m, and the value of bending moment effect is 10092 kN·m. The value of shear resistance at the support at two ends is 1255 kN, and the value of shear force effect is 1311 kN. Because the ratio of load action efficiency to resistance effect is between 1.0 and 1.2, progressive impact loading test should be performed.

(6) Solution Formulation of Progressive Impact Loading Test

Calculated static loading points 11, 12, 18, and 19 are used as impact loading points, maximum impact load at each impact loading point equals to corresponding calculated static load, and the maximum impact loads at calculated static loading points 11, 12, 18, and 19 are respectively 150 kN, 50 kN, 150 kN, and 50 kN. There are in total five grades of impact loading. Values of loading at the points 11 and 18 are sequentially 30 kN, 60 kN, 90 kN, 120 kN, and 150 kN. Values of loading at the points 12 and 19 are sequentially 10 kN, 20 kN, 30 kN, 40 kN, and 50 kN.

(7) Performance of Progressive Impact Loading Test

Impact equipment is moved to the impact loading points 11, 12, 18, 19, and the displacement sensors are set on the displacement measurement points 4, 11, 18 then, four points are impacted at the same time, and data of impact force and dynamic deflections are received. After that, the impact forces are increased by steps, maximum dynamic deflection of measurement points at control section under the maximum impact load is obtained finally. After impact loading ends, and when the bridge is stable, then the residual deflection at the displacement measurement point is received. During the test, conditions of cracks and foundation displacements also are inspected.

(8) Assessment of the Bearing Capacity of the Bridge

When the maximum impact load is applied at all four impact loading points, the value of maximum dynamic deflection at the displacement measurement point 11 is greater than those at the displacement measurement points 4 and 18. According to the correspondence between the maximum dynamic deflection and static deflection, it is derived that actual static deflection at the displacement measurement point 11 of the bridge under the effect of the calculated static load is 5.2 mm. The value is less than calculated deflection value 5.5 mm at the displacement measurement point 11 caused by the calculated static load. The measured maximum residual deflection at the displacement measurement point is 0.8 mm. The value of relative residual deflection is less than 20%, cracking condition is good, and the foundation is stable. Then checking coefficient is obtained according to the calibration coefficient, and it is calculated from the checking coefficient that the value of bending moment effect of mid-span section is 9937 kN·m, and the value of shear force effect at support is 1295 kN. In this case, the ratio of load action effect to resistance effect is less than 1.05, and it is finally determined that the bearing capacity of the bridge satisfies requirement.

In conclusion, the bridge inspection and evaluation method based on impact vibration according to the present invention accomplishes complete inspection and evaluation of the bridge.

What is claimed is:

1. A bridge inspection and evaluation method based on impact vibration, comprising:
performing backward analysis of a bridge based on impact on divided blocks without reference points and forward analysis of a bridge based on progressive impact loading, wherein the backward analysis of the bridge based on impact on divided blocks without reference points is used to rapidly inspect medium and small bridges from a road network to find bridges with serious shortage of bearing capacity, and the forward analysis of the bridge based on progressive impact loading is used to evaluate an actual bearing capacity of bridges, in good safety condition according to the backward analysis;

wherein a flexibility identification method of an overall structure of the bridge based on impact on divided blocks without reference points is used in the backward analysis of the bridge, and specifically comprises:

estimating a frequency response function of a sub-block of the overall structure, identifying modal parameters of the sub-block, scaling modal shape of the sub-block, determining a direction of the modal shape of the sub-block, and calculating a flexibility matrix of the overall structure.

2. The bridge inspection and evaluation method based on impact vibration according to claim 1, wherein an impact test on blocks without reference points is used in the backward analysis of the bridge based on impact on blocks without reference points, and specifically comprises:

dividing the overall structure of the bridge into several sub-blocks, wherein locations of impact points and measurement points in different sub-blocks are selected independently, performing point-by-point impact on impact points in each of the sub-blocks, and at the same time receiving impact force time-history data of each of the sub-blocks and acceleration time-history data of measurement points.

3. The bridge inspection and evaluation method based on impact vibration according to claim 1, wherein in the flexibility identification method of the overall structure based on impact on blocks without reference points, during the modal shape scaling of the sub-block, a scaling degree of the modal shape of a sub-block $S_1$ is used as a standard to perform the modal shape scaling on all sub-blocks of the overall structure, and the formula is:

$$\{\tilde{\phi}_r^{S_k}\} = \eta_r^{S_k} \sqrt{\frac{Q_r^{S_k}}{Q_r^{S_1}}} \{\phi_r^{S_k}\},$$

where $\{\phi_r^{S_k}\}$ and $\{\tilde{\phi}_r^{S_k}\}$ are respectively $r^{th}$ modal shapes of sub-block $S_k$ before and after the modal shape scaling, $\phi_r^{S_k}$ is scaling coefficient of the $r^{th}$ modal shape of the sub-block $S_k$ before the modal shape scaling, $\phi_r^{S_1}$ is scaling coefficient of the $r^{th}$ modal shape of the sub-block $S_1$, and $\eta_r^{S_k}$ is direction coefficient of the $r^{th}$ modal shape of the sub-block $S_k$ ($\eta_r^{S_k}=+1$ or $\eta_r^{S_k}=-1$);

and subsequently, the scaled modal shapes of all the sub-blocks $S_1, S_2, \ldots, S_k, \ldots$, and $S_n$ are integrated into a modal shape of the overall structure of the bridge, and the formula is:

$$\{\tilde{\phi}_r\} = \left(\{\tilde{\phi}_r^{S_1}\}^T \{\tilde{\phi}_r^{S_2}\}^T \cdots \{\tilde{\phi}_r^{S_k}\}^T \cdots \{\tilde{\phi}_r^{S_n}\}^T\right)^T$$

$$= \left(\{\phi_r^{S_1}\}^T \eta_r^{S_2} \sqrt{\frac{Q_r^{S_2}}{Q_r^{S_1}}} \{\phi_r^{S_2}\}^T \cdots \eta_r^{S_k} \sqrt{\frac{Q_r^{S_k}}{Q_r^{S_1}}} \{\phi_r^{S_k}\}^T \cdots \right.$$

$$\left. \eta_r^{S_n} \sqrt{\frac{Q_r^{S_n}}{Q_r^{S_1}}} \{\phi_r^{S_n}\}^T \right)^T,$$

wherein $\{\tilde{\phi}_r\}$ is the $r^{th}$ modal shape of the overall structure of the bridge determined by using the scaling degree of the modal shape of the sub-block $S_1$.

4. The bridge inspection and evaluation method based on impact vibration according to claim 1, wherein in the flexibility identification method of the overall structure based on impact on blocks without reference points, during the calculation of the flexibility matrix of the overall structure, potential energy of the overall structure of the bridge is first calculated, direction coefficient of a modal shape of each sub-block which corresponds to minimum potential energy is then obtained, and a modal shape of the overall structure of the bridge is obtained based on the direction coefficient, wherein an expression of the potential energy of the overall structure of the bridge which comprises the direction coefficient of the modal shape of each sub-block is:

$$\Pi_p = -\frac{1}{2} \sum_{r=1}^{m} \left( \{f^{S_1}\}^T \{\phi_r^{S_1}\} + \{f^{S_2}\}^T \{\phi_r^{S_2}\} \eta_r^{S_2} \sqrt{\frac{Q_r^{S_2}}{Q_r^{S_1}}} + \right.$$

$$\left. \cdots + \{f^{S_k}\}^T \{\phi_r^{S_k}\} \eta_r^{S_k} \sqrt{\frac{Q_r^{S_k}}{Q_r^{S_1}}} + \cdots + \{f^{S_n}\}^T \{\phi_r^{S_n}\} \eta_r^{S_n} \sqrt{\frac{Q_r^{S_n}}{Q_r^{S_1}}} \right)^2$$

$$\left(\frac{Q_r^{S_1}}{-\lambda_r} + \frac{Q_r^{S_1*}}{-\lambda_r^*}\right),$$

wherein $\Pi_p$ is the potential energy of the overall structure of the bridge, $\{f^{S_k}\}$ represents node load vector in any sub-block $S_k$, $\lambda_r$ is $r^{th}$ system pole, $\lambda_r^*$ and $Q_r^{S_1*}$ are respectively conjugate complex numbers of $\lambda_r$ and $Q_r^{S_1}$, and m represents maximum order number of calculation.

5. A bridge inspection and evaluation method based on impact vibration, comprising:

performing backward analysis of a bridge based on impact on divided blocks without reference points and forward analysis of a bridge based on progressive impact loading, wherein the backward analysis of the bridge based on impact on divided blocks without reference points is used to rapidly inspect medium and small bridges from a road network to find bridges with serious shortage of bearing capacity, and the forward analysis of the bridge based on progressive impact loading is used to evaluate an actual bearing capacity of bridges, in good safety condition according to the backward analysis, wherein progressive impact loading test is used in the forward analysis of the bridge based on progressive impact loading, and comprises: selecting an impact loading point at a calculated static loading point; making maximum impact load at each of selected impact point equal to corresponding calculated static load; grading an application of an impact load; using acceleration measurement points on deflection control section as displacement measurement points and arranging displacement sensors at the displacement measurement points, measuring maximum dynamic deflection at each of the displacement measurement points point under an effect of the impact load, and after impact loading ends, and when the bridge is stable, then measuring a residual deflection at the displacement measurement point; and deriving actual static deflections at the displacement measurement points of the bridge under the effect of the calculated static load, according to the correspondence between maximum dynamic deflection and static deflection, and assessing the bearing capacity of the bridge by using the actual static deflections and residual deflections at the displacement measurement points in conjunction with cracks and foundation displacements.

* * * * *